US009503835B2

(12) United States Patent
Fleck et al.

(10) Patent No.: US 9,503,835 B2
(45) Date of Patent: Nov. 22, 2016

(54) SERVICE PROVISIONING THROUGH A SMART PERSONAL GATEWAY DEVICE

(71) Applicant: Microsoft Technology Licensing, LLC, Redmond, WA (US)

(72) Inventors: Rod G. Fleck, Redmond, WA (US); William J. Westerinen, Redmond, WA (US); Rajeev Badyal, Redmond, WA (US); Philip L. Barnes, Redmond, WA (US); Vijayanand Vishwanathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 14/302,323

(22) Filed: Jun. 11, 2014

(65) Prior Publication Data

US 2014/0369275 A1 Dec. 18, 2014

Related U.S. Application Data

(60) Provisional application No. 61/834,422, filed on Jun. 13, 2013.

(51) Int. Cl.
*H04W 4/00* (2009.01)
*H04W 72/04* (2009.01)
*H04W 8/00* (2009.01)
*H04L 29/08* (2006.01)
*H04W 88/16* (2009.01)
(Continued)

(52) U.S. Cl.
CPC .......... *H04W 4/001* (2013.01); *H04L 67/2842* (2013.01); *H04W 8/005* (2013.01); *H04W 72/04* (2013.01); *H04W 4/008* (2013.01); *H04W 84/10* (2013.01); *H04W 84/18* (2013.01); *H04W 88/16* (2013.01)

(58) Field of Classification Search
CPC ... H04W 4/001; H04W 72/04; H04W 88/16; H04W 84/18; H04W 8/005; H04W 4/008; H04W 84/10; H04L 67/2842
See application file for complete search history.

(56) References Cited

U.S. PATENT DOCUMENTS

| | | | |
|---|---|---|---|
| 7,039,033 B2 | 5/2006 | Haller et al. | |
| 2002/0199061 A1* | 12/2002 | Friedman | G06Q 10/107 711/118 |
| 2003/0229900 A1* | 12/2003 | Reisman | G06F 17/30873 725/87 |

(Continued)

FOREIGN PATENT DOCUMENTS

WO 0137467 A1 5/2001

OTHER PUBLICATIONS

Park, Will, "Novatel puts the "intelligent" in MiFI Portable Intelligent Hotspot!", Retrieved at: http://www.intomobile.com/2009/02/27/novatel-puts-the-intelligent-in-mifi-portable-intelligent-hotspot/, Feb. 27, 2009, 6 pages.

(Continued)

Primary Examiner — Jianye Wu
(74) Attorney, Agent, or Firm — Judy Yee; Micky Minhas

(57) ABSTRACT

Embodiments include a smart personal gateway device (SPGD) that augments the capabilities of smart personal devices (SPDs) connected in a personal area network (PAN). The SPGD implements services for the SPDs using computing resources of the SPGD. In some embodiments, the SPGD provides carrier-grade voice services to SPDs lacking hardware to support such services (e.g., SPDs supporting Wi-Fi only).

20 Claims, 7 Drawing Sheets

(51) Int. Cl.
*H04W 84/10* (2009.01)
*H04W 84/18* (2009.01)

(56) References Cited

U.S. PATENT DOCUMENTS

| | | | |
|---|---|---|---|
| 2004/0203800 A1 | 10/2004 | Myhre et al. | |
| 2006/0230073 A1* | 10/2006 | Gopalakrishnan | G06F 17/30038 |
| 2007/0171852 A1* | 7/2007 | George | H04W 88/06 370/328 |
| 2008/0204873 A1* | 8/2008 | Daniell | H04N 13/0454 359/463 |
| 2010/0242079 A1* | 9/2010 | Riedl | H04N 7/17318 725/115 |
| 2010/0267368 A1 | 10/2010 | Masputra | |
| 2011/0021187 A1 | 1/2011 | Jayapalan et al. | |
| 2011/0179203 A1 | 7/2011 | Galloway et al. | |
| 2012/0182978 A1 | 7/2012 | Masputra | |
| 2013/0070209 A1* | 3/2013 | Cantelobre | G09G 3/025 353/37 |
| 2013/0103860 A1 | 4/2013 | Galloway et al. | |
| 2013/0107783 A1 | 5/2013 | Shaw | |
| 2013/0143495 A1 | 6/2013 | Ricci | |
| 2013/0219039 A1 | 8/2013 | Ricci | |
| 2014/0215539 A1* | 7/2014 | Chen | H04N 21/2365 725/93 |
| 2014/0279294 A1* | 9/2014 | Field-Darragh | G06Q 10/087 705/28 |
| 2014/0282683 A1* | 9/2014 | Chee | H04N 21/4104 725/30 |

OTHER PUBLICATIONS

Fujitsu Laboratories Ltd., "Fujitsu Develops Thin Client Gateway Technology Enabling Use of PC Web Application Interfaces on Smart Devices", Retrieved at: http://www.fujitsu.com/global/news/pr/archives/month/2013/20130618-02.html, Jun. 18, 2013, 4 pages.

Zoom Telephonics Inc., "Travel Router with Wireless-N", Retrieved at: http://www.zoomtel.com/products/4506.html., Retrieved on Aug. 26, 2013, 1 page.

O'Brien, Terrence, "ZoomTether shares your phone's connection, tethering plan optional", Retrieved at: http://www.engadget.com/2012/06/08/zoomtether-shares-your-phones-connection-tethering-plan-option/, Jun. 8, 2012, 3 pages.

Chalmers, Robert, et al., "A Mobile Gateway for Small-Device Networks", in Proceedings of Second IEEE Annual Conference on Pervasive Computing and Communications, Jun. 2004, 10 pages.

Electronic Design, "Personal-Mobile-Gateway Devices Bridge Gap", Retrieved at: http://www.electronicdesign.com/boards/personal-mobile-gateway-devices-bridge-gap, Jul. 1, 2003, 4 pages.

Baig, Edward C., "Wi-Fi on the go with MiFi 2200 Intelligent Mobile Hotspot", Retrieved at: http://usatoday30.usatoday.com/tech/columnist/edwardbaig/2009-05-13-mifi-wireless-mobile-hotspot_N.htm, May 14, 2009, 2 pages.

"Personal area network", Wikipedia, Retrieved at: http://www.en.wikipedia.org/wiki/Personal_area_network, Retrieved on Aug. 26, 2013, 3 pages.

"International Search Report and Written Opinion Issued in PCT Patent Application No. PCT/US2014/042146", Mailed Date: Jan. 20, 2015, 14 Pages.

* cited by examiner

SERVICE PROVISIONING THROUGH A SMART PERSONAL GATEWAY DEVICE

CROSS-REFERENCE TO RELATED APPLICATION

This application claims the benefit of pending U.S. Provisional Application No. 61/834,422, filed Jun. 13, 2013, the entirety of which is hereby incorporated by reference herein.

This application is related to a U.S. patent application entitled "Providing Storage and Security Services with a Smart Personal Gateway Device," which is incorporated by reference herein in its entirety

BACKGROUND

The number of smart personal devices (SPDs) per person is continuously increasing, such as laptops, smart phones, tablets, devices supporting BLUETOOTH brand communications, and media devices including digital cameras. New devices are now entering the market from eyewear displays, cameras, smart watches, biometric devices, and more.

Many devices are inconsistent in capabilities, and virtually no common services are available to all devices. For example, some of these devices have no networking, some support BLUETOOTH brand communications and/or wireless fidelity (Wi-Fi), and some have full wide area network (WAN) cell phone stacks. Thus, some devices may talk to one of many networks, some devices provide only data (e.g., no voice, location, persistent storage, etc.), some devices cannot talk to any other devices (e.g., like many of today's cameras), etc.

Some of the existing systems, while insufficient, attempt to network SPDs. For example, some devices act as WAN hotspots to allow multiple SPDs to access connectivity to carrier WAN data networks using Wi-Fi to connect between SPDs and the hotspot. However, many of these systems are limited to data only. That is, no known systems provide any voice, location, authentication, or other expanded features. As another example, some devices support smart phone tethering to allow a smart phone to appear as a hotspot to other SPDs, again using Wi-Fi to connect devices. However, most tethering solutions are limited to simple data communications or interface through a specific application program.

In still another example, some devices support short-range wireless communication between electronic components, such as via BLUETOOTH brand communications which standardize physical and datalink layers and provide limited profiles. However, such BLUETOOTH brand personal area networks (PANs) are limited to SPDs with BLUETOOTH brand radio transceivers.

SUMMARY

Embodiments of the disclosure provision services to smart personal devices (SPDs) connected to a smart personal gateway device (SPGD) in a personal area network (PAN). At least one of the SPDs accesses, from the SPGD, a catalog of services including services registered with the SPGD by the SPDs. The SPD selects at least one of the services from the catalog, where the selected service is separate and/or different from services registered with the SPGD by the SPD. The SPD provides, to the SPGD, data relating to the selected service, wherein the SPGD performs the selected service on behalf of the SPD using the related data from the SPD and computing resources associated with the SPGD.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
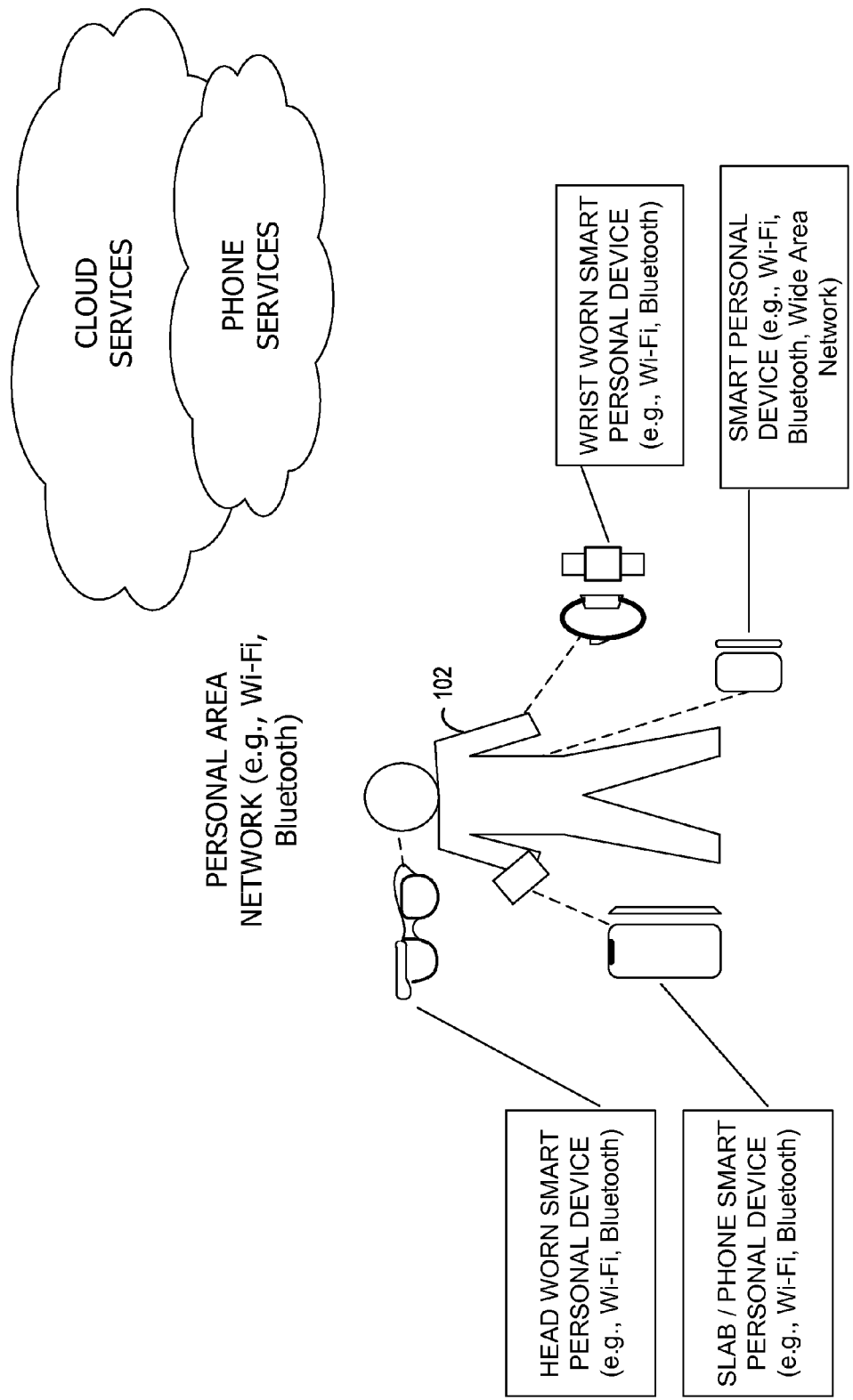
FIG. 1 is an exemplary block diagram illustrating smart personal devices (SPDs) in a personal area network (PAN).

Referring to the figures, embodiments of the disclosure augment capabilities of smart personal devices (SPDs) 206 in a personal area network (PAN) 202 of a user 102. In some embodiments, the capabilities of the SPDs 206 are augmented using computing resources of a smart personal gateway device (SPGD) 204. The SPDs 206 may consume one or more services from the PAN 202 and/or provide one or more services to the PAN 202.

As an example, the SPGD 204 searches for SPDs 206 within a range (e.g., three meters) of the SPGD 204, authenticates with any detected SPDs 206, and provides a service list or other catalog 216 to the detected SPDs 206. The catalog 216 includes a list of services provided by the SPGD 204, such as those services described herein. The SPGD 204 is capable of supporting common services for all SPDs 206 in the PAN 202, in some embodiments, such as location, NFC payment, building/car access, write cache (e.g., for offline cloud access), common cache for device synchronization, common network storage, etc. Alternatively or in addition, each detected SPD 206 provides a list of services supported by the SPD 206 to the SPGD 204. In this manner, each of the detected SPDs 206 subscribes to particular services offered by, or through, the SPGD 204 to immediately augment the internal capabilities of the SPD 206.

Exemplary services include, but are not limited to cellular data, wide area network (WAN) data connectivity, cellular voice services, local area network (LAN) connectivity (including both wired and wireless), body area network connectivity, authentication services, short message service (SMS), audio capture, video capture, image capture (e.g., camera), visual display, audio rendering and output, human interface (e.g., touch screen, button), media library and storage, file system, address book, geographic location, inertial motion, and calendar.

In some embodiments, SPD 206 refers to a smart (e.g., contains processing capabilities and generally some form of user interface (UI) and/or user experience) personal (e.g., worn, carried, and/or mobile) device. Examples include mobile phones (e.g., without modems), wrist and/or glasses based devices, and even personal computer laptop devices. However, the SPD 206 may also include non-user-experience oriented devices such as biometric sensors, simple information (like light emitting diode (LED) or segment displays), and/or capture devices such as a necklace camera.

In some embodiments, SPGD 204 refers to a common device used by multiple SPDs 206 to provide multiple disaggregated services to SPDs 206 supporting a common interface (e.g., potentially over multiple wired and/or wireless communication paths). With a small form factor in some embodiments, the SPGD 204 disappears into the lifestyle of the user 102, is easy to carry on-person at all times, is simple to configure, is simple to charge, connects with all SPDs 206 of that user 102, and supports all mobile products, in some embodiments. While the SPGD 204 is described in some embodiments herein as a dedicated device, the functionality of the SPGD 204 may be implemented by one of the SPDs 206 in the PAN 202. Such an SPD 206 may also provide or consume services offered through the functionality of the SPGD 204.

Aspects of the disclosure further contemplate an easily carried (e.g., credit card size) device (e.g., the SPGD 204) to bring additional capabilities and consistent capabilities to users 102 with multiple SPDs 206. In some embodiments, the thickness of the SPGD 204 is about the thickness of four stacked credit cards.

Aspects of the disclosure disambiguate the hardware and/or software associated with communication modalities from the SPDs 206. Rather, such hardware and/or software is provided by the SPGD 204 to those SPDs 206, thus reducing the hardware and/or software complexity and cost of each SPD 206.

As a non-limiting example of the SPGD 204 in operation, the SPD 206 operating in connection with the SPGD 204 may make a telephone call without the SPD 206 actually having the hardware and/or software functionality to make a telephone call. The SPGD 204 provides the cellular modem and communication stack functionality to the SPD 206. For example, a Wi-Fi-only SPD 206 may make a cellular telephone call by connecting through the SPGD 204.

As an example, the SPGD 204 includes a device acting as a central communications hub and service provider for multiple SPDs 206. The SPGD 204 contains multiple communication hardware and/or software to support long-term evolution (LTE), Wi-Fi, BLUETOOTH brand communications, and more. The SPGD 204 has a CPU that not only routes traffic, but also provides services such as voice for all the SPDs 206 that connect to it. The SPGD 204 also provides multiple optional services such as common storage, data caching, location, authentication, and near-field communications (NFC) payment, set-up and/or other financial transactions on behalf of the SPDs 206. In general, the SPGD 204 enables SPDs 206 to have a far richer set of capabilities and communication without burdening each SPD 206 with significant overhead in size, power consumption, and/or cost to support such capabilities.

In general, the SPGD 204 operates as a single common endpoint to carrier-based (e.g., WAN) networks, and provides more functionality than existing hotspots by, for example, supporting voice services on carrier grade voice including circuit switched (CS), voice over LTE (VoLTE), and/or voice over Internet Protocol (VoIP) services. Other carrier and over-the-top (OTT) services such as SMS, instant messaging (IM), video conferencing, gaming, and more are also supported in some embodiments. Further, multiple types of metro-area networks from traditional carrier solutions such as LTE to white-space and satellite are also operable with the SPGD 204.

In some embodiments, the SPGD 204 is capable of supporting either a single hub approach for communications between multiple SPDs 206 (e.g., Wi-Fi), or a gateway function between the SPGD 204 and SPDs 206 via alternative wireless links such as BLUETOOTH brand communications, multiple channel Wi-Fi, multi-band Wi-Fi, time-division-multiplexing (TDD) based Wi-Fi, wireless universal serial bus (USB), 802.11ad, etc. Some implementations of the SPGD 204 may also resolve access point and Wi-Fi Direct concurrent access issues by either supporting multiple Wi-Fi radios and/or Wi-Fi multiplexing.

Referring next to FIG. 1, an exemplary block diagram illustrates SPDs 206 in the PAN 202. In the example of FIG. 1, the user 102 carries a variety of SPDs 206 including head worn SPDs 206 (e.g., eyeglasses, hats), wrist worn SPDs 206 (e.g., a watch), "slab" form factor SPDs 206 (e.g., tablets, smart mobile telephones), and other SPDs 206 (e.g., laptops). Some of the SPDs 206 may support Wi-Fi and BLUETOOTH brand communications, while other SPDs 206 may provide WAN support. As described herein, the SPGD 204 forms the PAN 202 to enable the collection of SPDs 206 of the user 102 to communicate with WANs such as those providing cloud services and phone services. In general, the SPGD 204 implements the functionality described herein to provide a gateway between the SPDs 206 and the WAN. While described in some embodiments as providing a gateway between the PAN 202 of SPDs 206 and at least one cellular network, aspects of the disclosure operate to provide a gateway between the PAN 202 and any type of WAN (e.g., satellite, white space, etc.). Further, the SPGD 204 establishes, forms, or otherwise creates the PAN 202 for the SPDs 206 to communicate with each other and with the services and devices in the WAN.

The SPGD 204 creates the PAN 202 based on an interaction between the SPDs 206 and the SPGD 204. In a registry-based example, the SPGD 204 searches for SPDs 206 within a range (e.g., three meters) of the SPGD 204 device, authenticates with any detected SPDs 206, and provides the catalog 216 of services or other service list to the detected SPDs 206. The catalog 216 of services describes services provided by the SPGD 204, such as (but not limited to) voice services, gaming services, authentication services, communication services, etc. The catalog 216 may also include services supported by the detected SPDs 206 and identified to the SPGD 204 by the SPDs 206.

Each of the detected SPDs 206 may subscribe to particular services offered by the SPGD 204 and identified in the catalog 216. The SPGD 204 maintains subscription information (e.g., a list of services) in memory, such as in a register, subscription list, database, etc. The SPGD 204 acts as a service broker to the SPDs 206 providing services and the SPDs 206 consuming services. In some embodiments, the SPGD 204 acts as an endpoint for those subscribed services to the WAN, and acts as a server to the SPDs 206 subscribed to those services. For example, the SPGD 204 may cache electronic mail messages received from an electronic mail service in the WAN, identify one or more of the SPDs 206 subscribed to the electronic mail service, and notify the SPDs 206 subscribed to the email service that emails are available. In this manner, the SPGD 204 downloads the emails once and provides them to the SPDs 206 upon request, rather than having each SPD 206 in the PAN 202 individually download each of the emails from the WAN.

Figure 2:
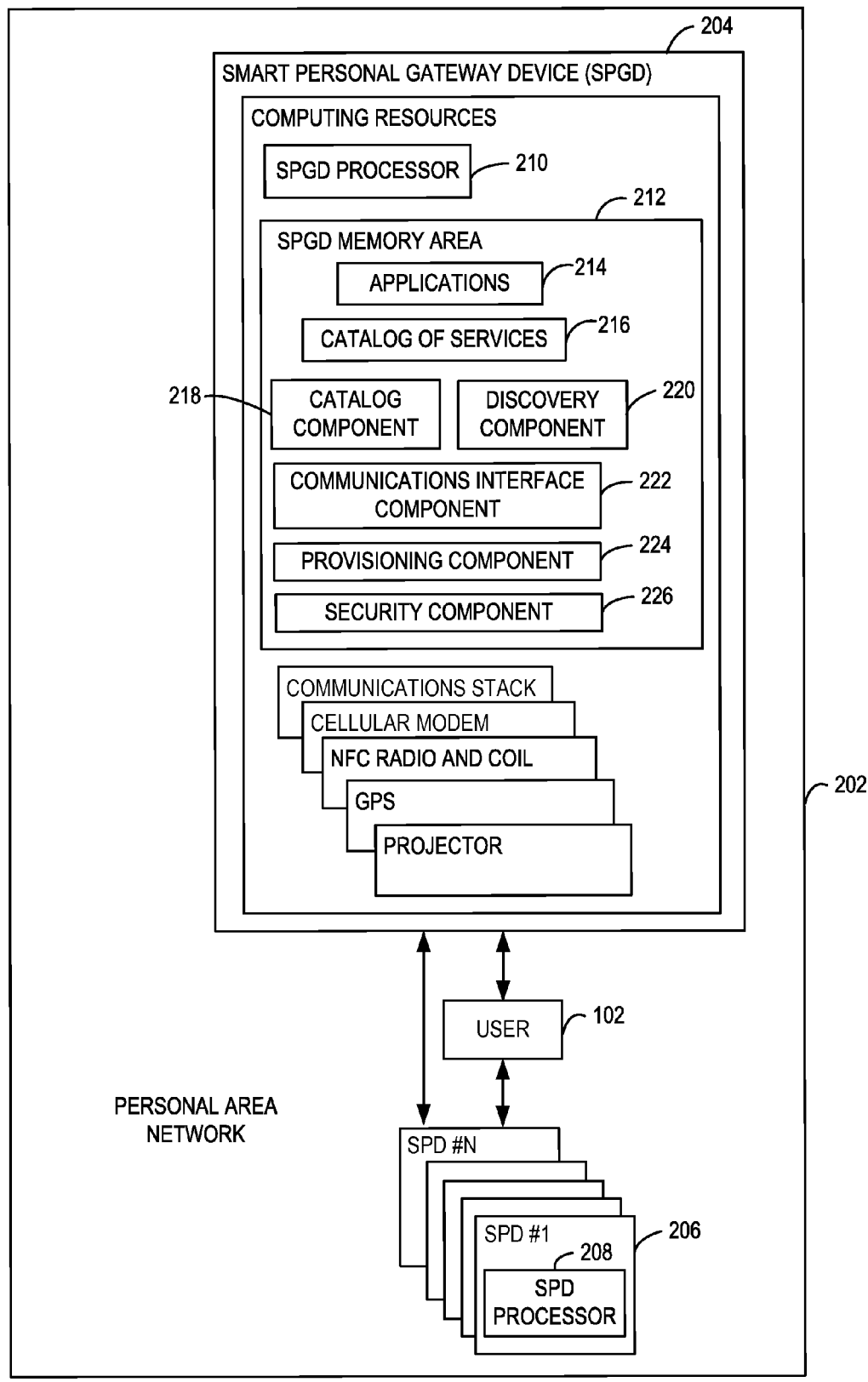
FIG. 2 is an exemplary block diagram illustrating a smart personal gateway device (SPGD) communicating with SPDs in a PAN.

Referring next to FIG. 2, an exemplary block diagram illustrates the SPGD 204 communicating with SPDs 206 within the PAN 202. In the example of FIG. 2, the SPGD 204 communicates with the user 102 and a plurality of SPDs 206, such as SPD#1 through SPD#N. At least one of the SPDs 206 includes an SPD processor 208. The SPD processor 208 includes any quantity of processing units, and is programmed to execute computer-executable instructions for implementing aspects of the disclosure. The instructions may be performed by the SPD processor 208 or by multiple processors executing within the SPD 206, or performed by a processor external to the SPD 206. In some embodiments, the SPD processor 208 is programmed to execute instructions such as those illustrated in the figures (e.g., FIG. 5). In some embodiments, the SPD processor 208 represents an implementation of analog techniques to perform the operations described herein. For example, the operations may be performed by an analog computing device and/or a digital computing device.

The SPGD 204 has a plurality of computing resources associated therewith. The computing resources include, but are not limited to, an SPGD processor 210 and an SPGD memory area 212. The SPGD processor 210 includes any quantity of processing units, and is programmed to execute computer-executable instructions for implementing aspects of the disclosure. The instructions may be performed by the SPGD processor 210 or by multiple processors executing within the SPGD 204, or performed by a processor external to the SPGD 204. In some embodiments, the SPGD processor 210 is programmed to execute instructions such as those illustrated in the figures (e.g., FIG. 4). In some embodiments, the SPGD processor 210 represents an implementation of analog techniques to perform the operations described herein. For example, the operations may be performed by an analog computing device and/or a digital computing device.

The SPGD memory area 212 includes any quantity of computer readable media associated with or accessible by the SPGD 204. The SPGD memory area 212 may be internal to the SPGD 204 (as shown in FIG. 2), external to the SPGD 204 (not shown), or both (not shown). In some embodiments, the SPGD memory area 212 includes read-only memory and/or memory wired into an analog computing device.

The SPGD memory area 212 stores, among other data, one or more applications 214. The applications 214, when executed by the SPGD processor 210, operate to perform functionality on the SPGD 204. Exemplary applications 214 include mail application programs, web browsers, calendar application programs, address book application programs, messaging programs, media applications, location-based services, search programs, and the like. The applications 214 may communicate with counterpart applications or services such as web services accessible via a network. For example, the applications 214 may represent downloaded endpoint applications that correspond to server-side services executing in a cloud (e.g., cloud 602 in FIG. 6 and FIG. 7).

The memory area further stores the catalog 216 of services representing services offered by the SPDs 206 in the PAN 202. The catalog 216 of services includes communication services, authentication services, and/or location services. The communication services include cellular voice services, cellular data services, WAN services, LAN services, Wi-Fi services, and/or SMS services. The catalog 216 of services may also include storage services, inertial motion services, and/or user interface services. Exemplary storage services include media library storage, file system storage, calendar storage, and/or address book storage. The catalog 216 of services may also include audio capture, video capture, image capture, visual display, audio rendering, video rendering, and/or image rendering.

The memory area further stores one or more computer-executable components. Exemplary components include a discovery component 220, a catalog component 218, a communications interface component 222, a provisioning component 224, and a security component 226. Execution of the components augments the capabilities of the SPDs 206 in the PAN 202, as further described below with reference to FIG. 4.

The computing resources of the SPGD 204 may also include one or more communication interfaces and/or network interfaces such as a communications stack, a cellular modem, NFC radio and coil, global positioning system (GPS) receiver and/or transmitter, and the like. The communications interfaces, in some embodiments, include hardware and/or computer-executable instructions (e.g., a driver) for operating the communications interfaces. Communication between the SPGD 204 and other devices may occur via the communications interfaces with any protocol or mechanism over any wired or wireless connection.

In an example in which at least one of the SPDs 206 lacks cellular voice services, the computing resources of the SPGD 204 further include a cellular modem and a communication stack. In this example, at least one of the SPDs 206 makes a telephone call via the SPGD 204.

The computing resources of the SPGD 204 may also include one or more user interface components, such as a graphics card for displaying data to the user 102 and receiving data from the user 102. The user interface components may also include computer-executable instructions (e.g., a driver) for operating the graphics card. Further, the user interface components may include a display (e.g., a touch screen display or natural user interface) and/or computer-executable instructions (e.g., a driver) for operating the display. The user interface component may also include one or more of the following to provide data to the user 102 or receive data from the user 102: speakers, a sound card, a camera, a microphone, a vibration motor, one or more accelerometers, a BLUETOOTH brand communication module, a projector, and a photoreceptive light sensor. For example, the user 102 may input commands or manipulate data by moving the computing device in a particular way.

In some embodiments, one or more of the user interface components may act as an input interface (e.g., a touch service or touch device) for one or more of the SPDs 206 (e.g., the SPDs 206 that are limited-input devices such as glasses-based solutions). In such embodiments, the SPGD 204 has a touch surface on at least one side. Alternatively or in addition, the SPGD 204 may act as a pointer (e.g., with gross navigation via sensors such as a gyroscope and/or accelerometer, or with fine navigation if a traditional mouse sensor is incorporated).

The SPGD 204 may also be used as a game controller in combination with one or more of the SPDs 206. Sensors (e.g., gyroscope, accelerometer, compass, etc.) in the SPGD 204 allow detection of motion that is used for controlling games, scrolling, and more on the SPDs 206. Buttons, touch surfaces, and the like on the SPGD 204 may also implement traditional game console controller capabilities for other SPDs 206.

The example of FIG. 2 illustrates the SPGD 204 incorporating a projector or other projection-based solution, instead of or in addition to a screen or other display. In these embodiments, the SPGD 204 may use local compute capabilities, or leverage one of the SPDs 206, to generate the images. In this case, the projector may be driven by an encoded video stream (e.g., H.264/H.265) or static images (e.g., joint photographic experts group (JPEG)/M-JPEG). Alternatively or in addition, the SPGD 204 may have a small display that acts as a second screen driven by another SPD 206. Users 102 may then use this for notifications, appointments, present time, and more. In still other embodiments, the SPGD 204 lacks a display or any display capabilities.

For scenarios in which the SPGD 204 is placed in a pocket or wallet of the user 102, sensors on the SPGD 204 (e.g., gyroscope, accelerometer, thermometer, heart rate monitor, etc.) may be used to provide services such as a pedometer, activity monitoring, calorie counting, pulse, etc. to the user 102.

The SPGD 204 may be implemented by any computing device configured as described herein. The computing device represents any device executing instructions (e.g., as application programs, operating system functionality, or both) to implement the operations and functionality described herein. For example, the SPGD 204 is implemented as a standalone device separate and distinct from a mobile telephone. In other examples, one or more aspects of the functionality of the SPGD 204 may be implemented by a mobile computing device or any other portable device. In some embodiments, the mobile computing device includes a mobile telephone, laptop, tablet, computing pad, netbook, gaming device, and/or portable media player. The SPGD 204 may also be implemented by less portable devices such as desktop personal computers, kiosks, tabletop devices, industrial control devices, wireless charging stations, and electric automobile charging stations. Additionally, the SPGD 204 may represent a group of processing units or other computing devices.

While the SPGD 204 contains sufficient compute resources to run services such as data and voice gateways, the SPGD 204 in some embodiments allows some tasks to be computed by the SPDs 206, in the cloud, and/or by the SPGD 204 (e.g., effectively acting as a local cloud or applications engine). Example services include voice recognition, facial recognition, non-GPS-based location, music recognition, and more.

Figure 3:
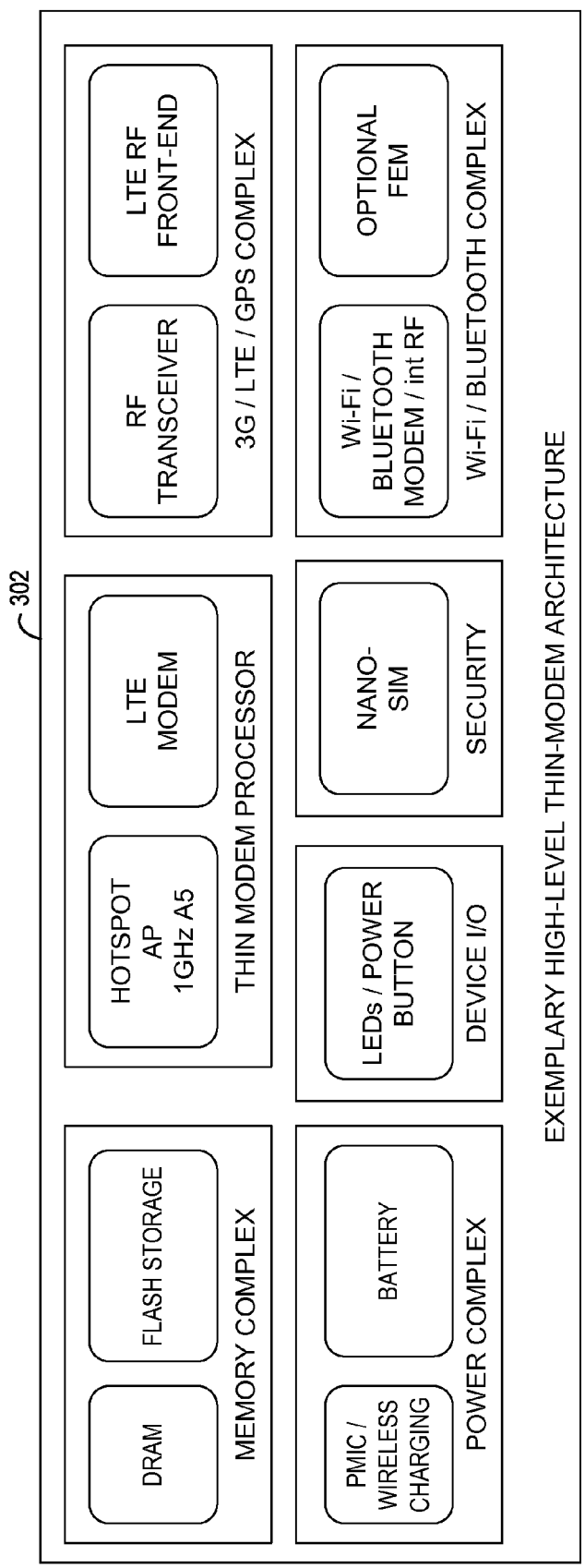
FIG. 3 is an exemplary block diagram illustrating a high-level thin-modem architecture for an exemplary SPGD.

Referring next to FIG. 3, an exemplary block diagram illustrates a high-level thin-modem architecture 302 for an exemplary SPGD 204. While the exemplary thin-modem architecture 302 includes the components illustrated in FIG. 3, aspects of the disclosure are operable with a thin-modem architecture having additional or fewer components. The thin-modem architecture is used to support WAN communications, along with an integrated computer applications processor. Additional radios such as for Wi-Fi, BLUETOOTH brand communications, etc. may be connected to the thin-modem architecture 302 to support communications to SPDs 206 and network access points. Dynamic random access memory (DRAM), or other memory, may be used for dynamic storage for the thin-modem complex, with flash-based local or user supplied secure disk input output (SDIO) flash for program code, applications code, application data, media, and the like. A power complex drives internal power rails, battery charging, and start-up sequencing, and an additional wireless charging solution may be used to charge a local battery. Additional components such as a subscriber identity module (SIM) card, sensors, microphone, GPS transceiver, and the like may be added to the primary board to enhance functions of the SPGD 204. An applications processor (e.g., the SPGD processor 210) in the thin-modem architecture 302 executes code to implement the services described herein. In some embodiments, the SPDs 206 execute complementary code to complete the functionality of the services.

The thin-modem architecture 302 enables the SPGD 204 to be operable with existing and future standards that may be leveraged for various synchronization and caching operations. Examples of present standards include cloud storage synchronization, mail synchronization, deferred application loading on mobile devices, network file storage, device properties, and more.

Figure 4:
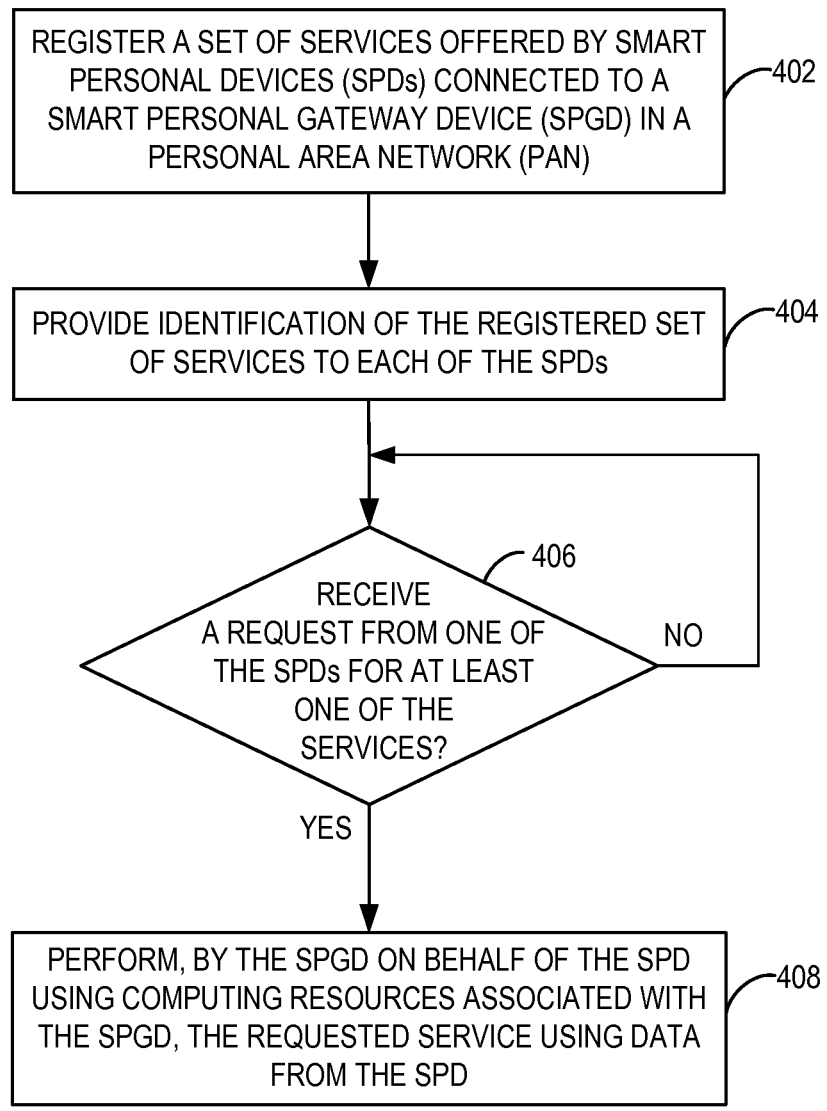
FIG. 4 is an exemplary flow chart illustrating operation of the SPGD to perform services on behalf of the SPDs.

Referring next to FIG. 4, an exemplary flow chart illustrates operation of the SPGD 204 to perform services on behalf of the SPDs 206. The operations illustrated in FIG. 4 are described with reference to execution by the SPGD 204. However, aspects of the disclosure contemplate execution of one or more of the operations by other devices or processors. Further, while some operations are described with reference to execution of the computer-executable components embodied or otherwise stored in the SPGD memory area 212, one or more of the operations may be performed by other components or modules of the SPGD 204.

Initial set-up of the SPGD 204 may done locally by the user 102 and/or remotely via a WAN-based service (e.g., in a cloud such as cloud 602) using a SIM ID, a device ID, user credentials, and/or other identifiers) of the SPGD 204 and/or user 102. Further, while any quantity of SPDs 206 may be connected to the SPGD 204, there may be five or six devices connected to the SPGD 204 in some embodiments. Updates to the SPGD 204 may occur via a user interface on the SPGD 204, via a user interface on one of the SPDs 206, and/or updates from a cloud service.

Registration of the services offered by the SPDs 206 in the PAN 202 with the SPGD 204 occurs at 402. Registration includes, in some embodiments, the SPGD 204 detecting the presence of each SPD 206, authenticating each detected SPD 206, and receiving a description of the services offered by each SPD 206. The SPGD 204 stores the received description in the catalog 216, list, database, registry, or other data structure.

The SPGD 204 provides the catalog 216 of services to each of the SPDs 206 in the PAN 202. For example, at 404, the SPGD 204 provides identification of the registered set of services to each of the SPDs 206. In response, or at a later time, at least one of the SPDs 206 selects at least one of the services identified by the SPGD 204. For example, the SPD 206 selects a service not currently supported by the SPD 206 (e.g., the SPD 206 lacks the hardware and/or software to implement the service). For example, a Wi-Fi SPD 206 may select a cellular voice service offered by the SPGD 204. The SPD 206 sends at least one request for the selected service to the SPGD 204. The SPD 206 also sends data associated with the request, either with the request or separately. For example, the Wi-Fi SPD 206 may send voice data to be conveyed over a cellular network.

Upon receipt by the SPGD 204 of the request from one of the SPDs 206 for at least one of the services at 406, the SPGD 204 performs the requested service on behalf of the requesting SPD 206 using the computing resources of the SPGD 204 at 408. Performance of the requested service includes using the data received from the requesting SPD 206 (e.g., in the request, or in a separate data transmission). The SPGD 204 may communicate with the SPD 206 during performance of the requested service, such as by providing voice data for playback by the SPD 206 to the user 102 and receiving additional voice data for transmission via the cellular voice service.

The operations illustrated in FIG. 4 may be implemented by the computer-executable components illustrated in FIG. 2. The SPGD memory area 212 includes one or more computer storage media embodying the computer-executable components. The discovery component 220, when executed by the SPGD processor 210, causes the SPGD processor 210 to search for and detect SPDs 206 within a predefined range of the SPGD 204. The predefined range may be set by the user 102, be a default value specified by the SPGD 204 manufacturer, be defined by limits associated with the technology used to perform the detection, etc. In some embodiments, the pre-defined range is approximately three meters. The search for SPDs 206, and additional SPDs 206, may occur in response to a request from the user 102, a request from one of the already-discovered SPDs 206, periodically/intermittently (e.g., daily), based on location (e.g., in a car, at home, etc.), and/or in response to another trigger.

The discovery component 220 further executes to register the catalog 216 of services offered by the detected SPDs 206 in the PAN 202. The catalog component 218, when executed by the SPGD processor 210, causes the SPGD processor 210 to provide identification of the catalog 216 of services registered by the discovery component 220 to each of the SPDs 206. The communications interface component 222, when executed by the SPGD processor 210, causes the SPGD processor 210 to receive a request from one of the SPDs 206 for at least one of the services. In some embodiments, the received request includes data relating to the requested service. The provisioning component 224, when executed by the SPGD processor 210, causes the SPGD processor 210 to perform, by the SPGD 204 on behalf of the SPD 206 using computing resources associated with the SPGD 204, the requested service (e.g., using any data received from the SPD 206 and relating to the requested service). In this manner, the provisioning component 224 performs the requested service to act as an endpoint for WAN services and to act as a server to the SPDs 206 in the PAN 202 for the WAN services.

Some embodiments further contemplate the security component 226 that, when executed by the SPGD processor 210, causes the SPGD processor 210 to authenticate the SPDs 206 detected by the discovery component 220 (e.g., in response to the discovery component 220 detecting the SPDs 206). The catalog component 218 provides identification of the catalog 216 of services to the authenticated SPDs 206.

Figure 5:
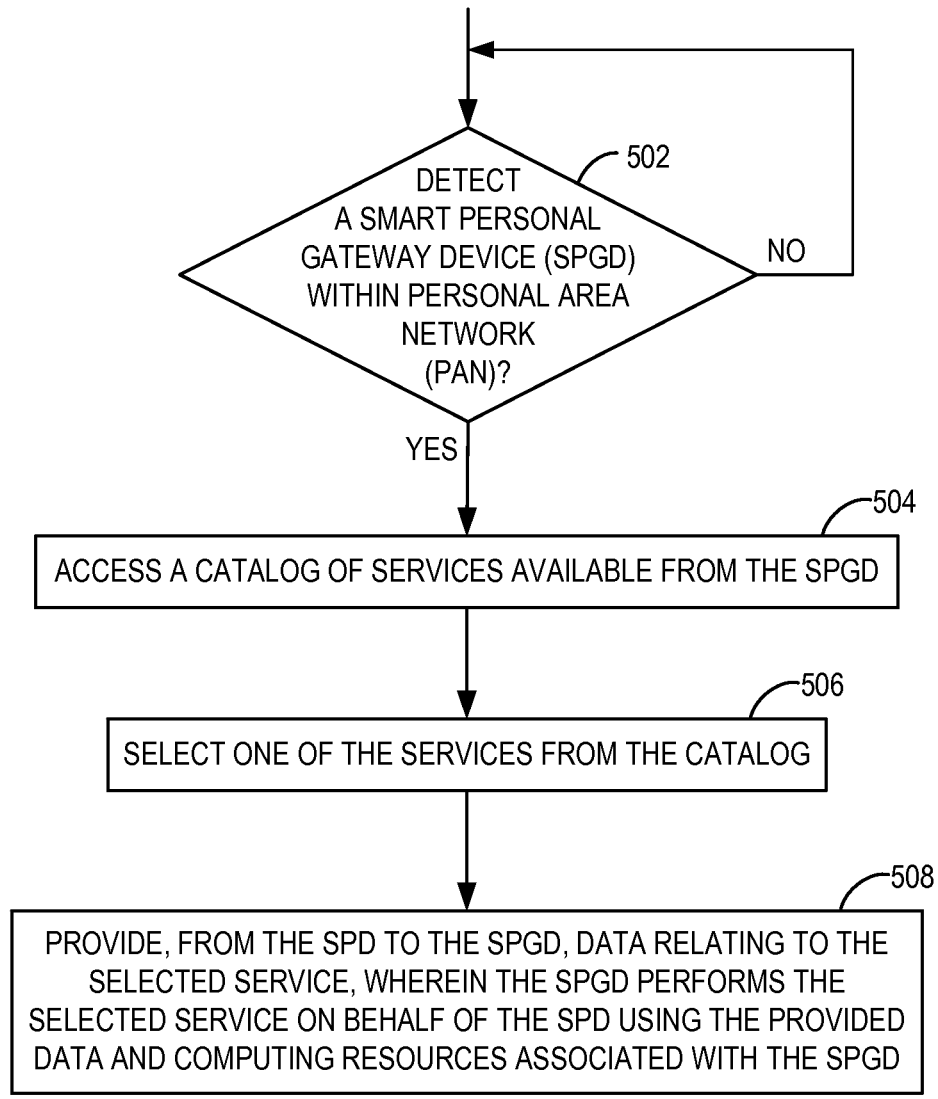
FIG. 5 is an exemplary flow chart illustrating operation of the SPDs to detect and communicate with the SPGD.

Referring next to FIG. 5, an exemplary flow chart illustrates operation of the SPDs 206 to detect and communicate with the SPGD 204. The operations illustrated in FIG. 5 are described with reference to execution by any of the SPDs 206. However, aspects of the disclosure contemplate execution of one or more of the operations by other devices or processors.

In some embodiments, the SPD 206 scans for the presence of the SPGD 204. The scanning may occur in response to a request from the user 102, a request from software executing on the SPD 206, periodically/intermittently (e.g., daily), based on location (e.g., in a car, at home, etc.), and/or in response to another trigger. While the SPD 206 may scan for the SPGD 204 when the SPD 206 is not connected to the SPGD 204, the SPD 206 may scan for additional SPGDs 204 when already connected to at least one SPGD 204.

Upon detection of the SPGD 204 within the PAN 202 at 502, the SPD 206 accesses the catalog 216 of services available from the SPGD 204 at 504. The catalog 216 includes, but is not limited to, services registered with the SPGD 204 by the SPDs 206 within the PAN 202. In some embodiments, the SPD 206 may also register its services with the SPGD 204 to be included in the catalog 216 and offered to the other SPDs 206 in the PAN 202.

At 506, the SPD 206 selects at least one of the services from the accessed catalog 216. In some embodiments, the selected service is separate and/or different from the services offered by the SPD 206 itself (e.g., a Wi-Fi SPD 206 may select a cellular voice service). Selecting the service may also be referred to as subscribing to the service.

At 508, the SPD 206 provides the SPGD 204 with data relating to the selected service. The SPGD 204 performs, using the provided data, the selected service on behalf of the SPD 206 using computing resources associated with the SPGD 204. During or after performance of the selected service, the SPGD 204 may provide the SPD 206 with data relating to the performance. For example, with the SPGD 204 acting as an endpoint for the selected service to the WAN, the SPGD 204 receives data from the WAN and forwards that received data to the SPD 206 (e.g., acting as a server for the selected service to the SPD 206) without the SPD 206 being connected to the WAN (e.g., in some examples).

The SPGD 204 and the SPDs 206 may operate in at least two modes. When Wi-Fi is not available (e.g., see FIG. 6), there is no access to Wi-Fi infrastructure for non-carrier based data access. When the SPD 206 is in the presence of Wi-Fi infrastructure but unable to use the infrastructure (e.g., due to lack of rights or other authentication), the SPD 206 and SPGD 204 operate as if the Wi-Fi infrastructure is not available. In this mode, the SPGD 204 appears to the SPDs 206 as an access point for Wi-Fi communications. Any request to a WAN-based service (e.g., a cloud service) from the SPD 206 is routed from the SPD 206 via the SPGD 204 to the WAN-based network, as described next with reference to FIG. 6.

Figure 6:
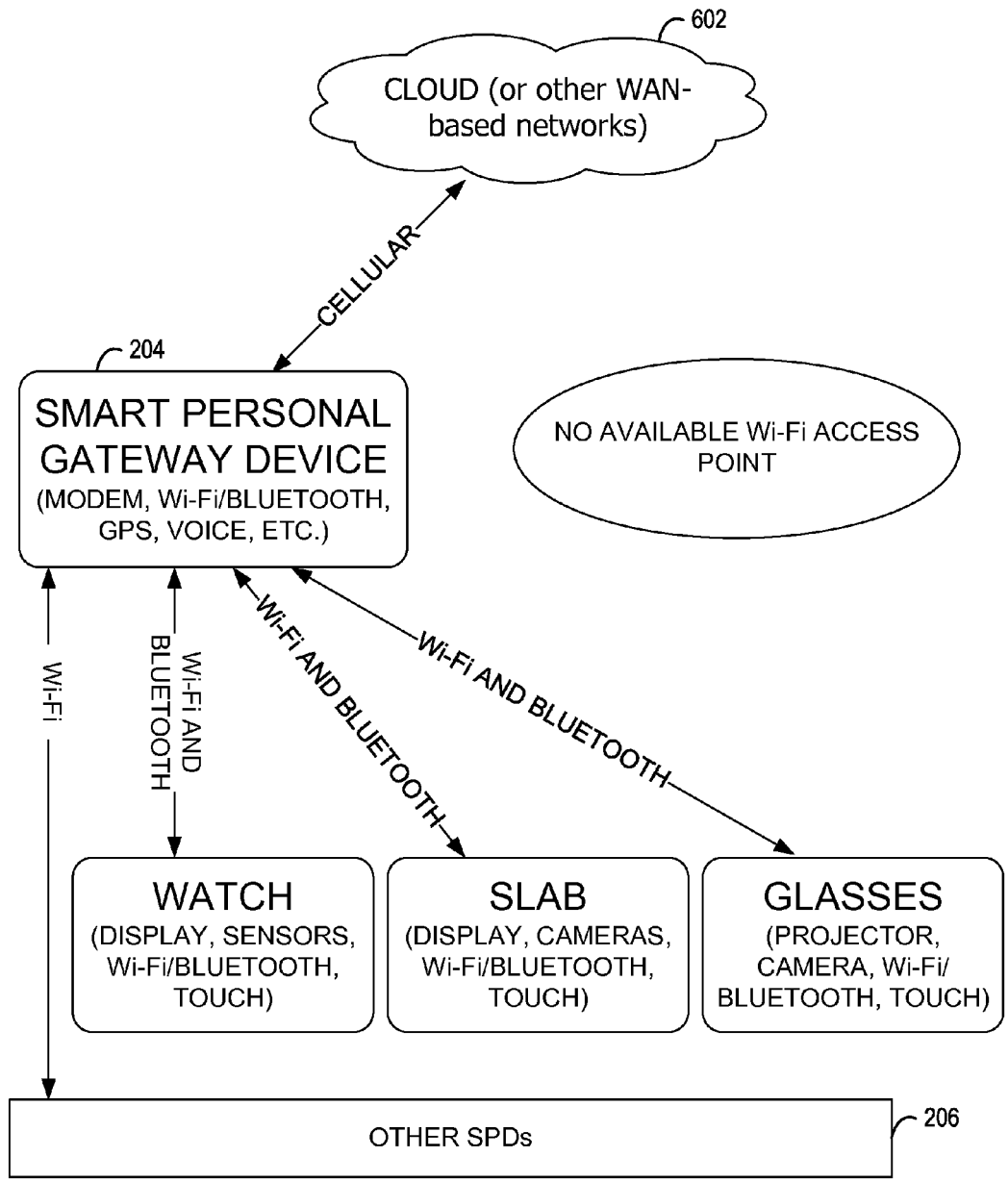
FIG. 6 is an exemplary block diagram illustrating the SPGD performing services on behalf of the SPDs when no wireless fidelity (Wi-Fi) access is available.

Referring next to FIG. 6, an exemplary block diagram illustrates the SPGD 204 performing services on behalf of the SPDs 206 when no Wi-Fi access is available. The SPGD 204 acts as an endpoint to services offered by the cloud 602 (e.g., the WAN), and as a server for those services to the SPDs 206 within the PAN 202. In the example of FIG. 6, the exemplary SPDs 206 include a watch, a slab device, and glasses. The different SPDs 206 are equipped with different hardware. For example, the watch has a display, sensors, a Wi-Fi radio, a BLUETOOTH brand communications module, and a touch interface. The slab has a display, one or more cameras, a Wi-Fi radio, a BLUETOOTH brand communications module, and a touch interface. The glasses have a projector, a camera, a Wi-Fi radio, a BLUETOOTH brand communications module, and a touch interface. The SPGD 204 communicates with the SPDs 206 via Wi-Fi and/or BLUETOOTH brand communications. As an example, the SPGD 204 may communicate with other SPDs 206 via Wi-Fi only.

Figure 7:
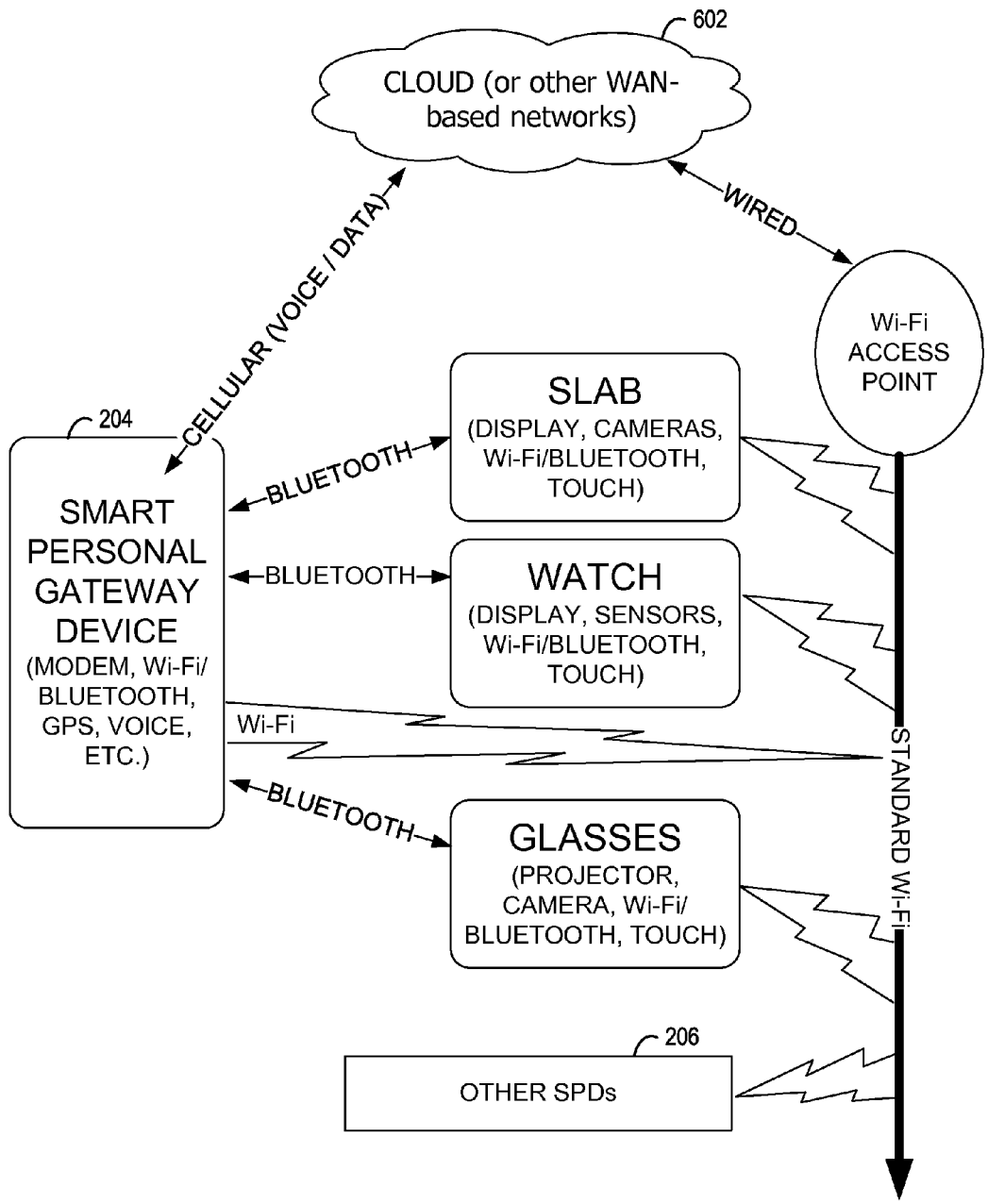
FIG. 7 is an exemplary block diagram illustrating the SPGD performing services on behalf of the SPDs when a Wi-Fi network is available.

In contrast, referring next to FIG. 7, an exemplary block diagram illustrates the SPGD 204 performing services on behalf of the SPDs 206 when a Wi-Fi network is available. When Wi-Fi is available, there is an access point where SPDs 206 and SPGD 204 may authenticate. In this mode, the access point is used for at least a portion of the data communication to WAN-based services (e.g., the cloud 602). VoIP voice/video/etc. may be processed directly from the SPD 206 (e.g., that may have advantages in power and/or latency) or be processed via the SPGD 204 (e.g., that has advantages such as call continuity). In this mode, the SPDs 206 form direct connections to the access points in the Wi-Fi network, but the SPGD 204 architecture also allows all communications to be routed through the SPGD 204 if desired for caching or other purposes. When SPDs 206 connect directly to the Wi-Fi access point, another data path may be created with the SPGD 204 via a number of methods such as BLUETOOTH brand communications or other non-Wi-Fi networks, Wi-Fi multi-channel multiplexing, indirectly over the access point (e.g., local IP routing), and/or via a separate Wi-Fi radio. This additional data path or channel provides the SPD 206 with access to features such as caching, wireless storage, set-up, and other services (e.g., location services from a GPS of the SPGD 204).

In either or both modes (e.g., with Wi-Fi, or without Wi-Fi), communications between SPD 206 and SPGD 204 leverage low-power Wi-Fi concepts (e.g., active power control including reduced power amplifier power for short distance that adapts to changing conditions and optimization of modulation efficiency) to reduce overall battery drain on these devices and to reduce spectrum spatial footprint (e.g., allow large numbers of users 102 of SPD/SPGDs in a single area) compared to existing 802.11 standards.

Exemplary Voice Services Provisioned by the SPGD

In some embodiments, the SPGD 204 executes instructions to provide voice communications between the SPGD 204 and SPDs 206. In one example, the SPGD 204 appears to the SPDs 206 as a mobile telephone supporting hands free BLUETOOTH brand communications while the SPDs 206 appears to the SPGD 204 as hands free BLUETOOTH brand endpoints. In such an example, isochronous voice and dialing, caller-identification, and contents are supported directly by the BLUETOOTH brand standard. Further, over the top data for control of such connections may occur via BLUETOOTH brand communications, Wi-Fi communications, or other wireless standards such as wireless USB. Aspects of the disclosure also support Wi-Fi-Direct, or other wireless standards with bandwidth capabilities more than two megabits per second, such as for supporting video conferencing and/or data sharing separate from or in addition to voice. In some embodiments, software supporting lower level communications operations executes on the SPGD 204 (which acts more as a bridge in such embodiments), while software supporting higher-level operations such as capture, playback, and user interface control executes on the SPDs 206.

The SPGD 204 in aspects of the disclosure is operable with both carrier grade voice, such as voice over LTE or circuit switched, and VoIP voice. The SPGD 204 may also support seamless handoffs between multiple carrier standards and VoIP services. Alternatively or in addition, the SPGD 204 supports multi-person audio/video conferencing, desktop sharing, and gaming. Aspects of the disclosure make one or more of these services and support available to all SPDs 206 in the PAN 202, without imposing the implementation costs of each of the services and support on each of the SPDs 206.

The SPGD 204 handles single ring (e.g., direct-to-specific-SPD communication) and multi-ring cases (e.g., ring-on-all-in-range communication) based on configuration. The SPGD 204 may also support multi-SIM mobile computing devices (e.g., in dual SIM dual standby (DSDS) or dual SIM dual access (DSDA) configurations), and allow multi-number, multi-identity support (or ring to a specific device such as a work SPD 206 and/or a personal SPD 206). The SPGD 204 handles transfer of a voice, video, and/or data session from one SPD 206 to another SPD 206 (e.g., transfer the call). In such embodiments, users 102 seamlessly move from an initial SPD 206 to a new SPD 206 via a number of mechanisms (e.g., directed call transfer, simply using a new SPD 206 activating a hand-over, etc.).

The SPGD 204 may also support non-SPDs 206 with one or more voice services. For example, the SPGD 204 may support voice calls directly via BLUETOOTH brand communications to headset or hands-free car services. The SPGD 204 may also support media services, such as music streaming via BLUETOOTH brand communications and/or advanced audio distribution profile (A2DP) communications. The SPGD 204 also supports biometric data collection, such as via BLUETOOTH brand low energy (LE) transmissions in some embodiments.

A voice recognition service provided by the SPGD 204 allows local voice processing (e.g., for device control, search, translation, etc.) while avoiding having vocabularies on all SPDs 206. The SPGD 204 may handle these requests via wireless requests for voice services or, when a local microphone exists, may process requests directly.

In some embodiments, the SPGD 204 leverages a microphone for noise cancellation and/or reduction, in tandem with microphones from other SPDs 206. This allows high special diversity for noise reduction compared to multiple microphones on a single SPD 206 with limited size.

While some implementations may not use the SPGD 204 as a phone-like voice device, other implementations contemplate a number of direct audio components that allow the following:

the SPGD 204 includes a speaker/microphone combination to allow the SPGD 204 to act as an audio conferencing device. SPGDs 204 with cameras allow video conferencing.

the SPGD 204 may have a microphone for use as a second audio input to an SPD 206 for stereo recording, or better noise reduction.

the SPGD 204 may include a speaker for music playback.

the SPGD 204 may include a traditional receiver and microphone to allow the SPGD 204 to be used for traditional phone calls.

Other Exemplary Services Provisioned by the SPGD

The SPGD 204 may also provision non-voice services to the SPDs 206. In some examples, the SPGD 204 acts as a central notification server and/or redirection server to avoid waking the SPDs 206 upon receipt of external cloud events (e.g., score update from a subscribed sports service), e-mail events, calendar events, instant message, SMS message, and the like. In these examples, the SPGD 204 queues messages sent from the cloud services to one or more of the SPDs 206 in the PAN 202. When the user 102 enables or other activates one of the SPDs 206 (e.g., wake from idle), the SPGD 204 transfers the cached notification, events, messages, etc. to that SPD 206.

The SPGD 204 may also act as a single sink or other endpoint for cloud traffic, such as when the cloud traffic is transmitted over cost-based networks. For example, the SPGD 204 receives an email from the WAN via a cost-based LTE network, but then transmits the email from the SPGD 204 to each of the SPDs 206 via a free or reduced cost link (e.g., over Wi-Fi) when the SPDs 206 are ready to consume the data. For example, the SPDs 206 may consume multiple packages from multiple services in one transmission or via one request from the SPD 206 to the SPGD 204. The SPGD 204 handles similar subscription services other than email in a similar manner (e.g., music, news, stock, weather, social networking, etc.).

The SPGD 204 may also alert the user 102 of the SPGD 204 and/or SPDs 206 when one or more SPDs 206 move out of range (e.g., when the user 102 leaves one of the SPDs 206 somewhere, such as in a coffee shop). Audio, vibration, and/or visual alarms may come from the SPGD 204 or one or more of the other SPDs 206. Similar warning are possible for low-power conditions, temperature alerts, biometric device alerts, non-authenticated use, etc., although aspects of the disclosure are operable to send alerts for any other signals and/or events of interest to the user 102.

The SPGD 204, when used with an associated cloud service, may also perform compression/decompression on content received from the cloud (e.g., cloud 602) for the SPDs 206 or sent to the cloud from the SPDs 206. While some existing solutions allow reduction of WAN traffic through data compression, the compression and decompression operations of the SPGD 204 and SPDs 206 are managed by the SPGD 204 without applications and/or operating system (OS) code on each SPD 206 being aware of the this service (e.g., the SPGD 204 handles the compression/decompression on behalf of the SPDs 206). As such, while the SPGD 204 is aware of the compression/decompression mechanisms and services, the SPDs 206 are not aware. For example, on downlink, the cloud service compresses the content and sends it to the SPGD 204. The SPGD 204 decompresses the content and sends the decompressed content to the SPDs 206 subscribed to receive the content. On uplink, the SPGD 204 receives uncompressed content from the SPDs 206, compresses the content, and sends the compressed content to the cloud service. The cloud service then decompresses the compressed content received from the SPGD 204. Another example includes web pages in which a request is made for a web page, but the request is sent through a proxy server. The proxy server gets the web page, compresses the web page, and sends the compressed web page back to the SPGD 204. The SPGD 204 then decompresses the content, and sends it on further to the SPD 206.

The SPGD 204 also bridges multiple WAN networks. For example, traditional networks (such as LTE, high-speed packet access (HSPA+), etc.) may be bridged to white-space frequency WAN networks (when available) where users 102 see limited differences (e.g., slight bandwidth decrease and/ or latency increase) at each SPD 206. In another example, just as the SPGD 204 provides significant savings in costs and fees, size (e.g., no modem/radio), and peak power when interfacing between the WAN and the SPDs 206, interfacing with another WAN only affects the SPGD 204 (not the SPDs 206) thus avoiding costs to the SPDs 206 for this other WAN network.

The SPGD 204 may also include GPS radios to provision location services to one or more of the SPDs 206. Assisted GPS (A-GPS) may also leverage the WAN radio to improve the initial fix, reduce the time to initial fix, identify the satellites to search, and more.

The SPGD 204 may store local maps, user requested maps, and/or map caches to act as a single map repository to the SPDs 206. The SPGD 204 provides the maps to the SPDs 206 on demand, in some embodiments. Uncached map portions may easily be retrieved on demand from the WAN by the SPGD 204, or deferred until low-cost networks are available.

In some embodiments, the SPGD 204 implements a location history service (e.g., using a mix of GPS, assisted GPS, sensors, and/or Wi-Fi access point beacons) to allow the user 102 to track previous locations to enable services such as find my car, or associate data to a location (e.g., which people the user 102 met at a certain time).

In some scenarios, the SPGD 204 has sensors to measure barometric pressure to enhance location information and/or sensor data (gyroscope, accelerometer, compass, etc.) as a reference for other SPDs 206. For example, the SPGD 204 may assist correlation between whether the user 102 is moving (e.g., when both SPGD 204 and SPD 206 are moving) or just a portion of the user's body (e.g., hand) is moving (e.g., the SPD 206 is moving but not the SPGD 204).

Additional Examples

In some embodiments, the SPGD 204 is calendar-, location-, and/or message-aware to provide additional assistance to the user 102 and pertinent information based on user settings, history, scanned user content, and the like. History may also include previous search results, previous web pages, cached network content (e.g., an embedded hypertext markup language (HTML) application) that were used for one SPD 206, but now desired by another SPD 206 (or again for the same SPD 206). Rather than relying on a cloud (e.g., WAN) for such services, the SPGD 204 provides the option of disconnected service.

The SPGD 204 may wake up the SPD 206 based on a keyword, a tap of the SPGD 204 (detected via sensors), and the like. In some embodiments, the SPGD 204 keeps contact information (e.g., a phone list) for common usage by other SPDs 206. Alternatively or in addition, the SPGD 204 acts as a central point for services such as a time service due to access by the SPGD 204 to the present time from the GPS and cellular networks.

In some embodiments, the SPGD 204 and SPDs 206 are capable of being wirelessly charged using a common charging pad or hub. The use of magnetic resonant coupling in some embodiments allows charging without regard to orientation, and allows charging of the SPGD 204 and multiple SPDs 206. Additionally, in some embodiments, the SPGD 204 has hardware to support kinetic, solar, and/or passive energy harvesting to power and charge the SPGD 204 and/or the SPDs 206. Further, the battery of the SPGD 204 may be leveraged to provide emergency power to the SPDs 206. Wired methods (e.g., USB) and/or wireless charging is possible in these embodiments.

In embodiments in which all the WAN-based radios are in a single SPGD 204, the SPGD 204 may use a larger antenna configurations rather than burden all the SPDs 206 individually. Examples include greater multiple-input multiple-output (MIMO) (4×2), better lower frequency (600 to 700 MHz) antennas, transmit diversity, etc. Some embodiments further contemplate separate antennas for improved operation. For example, the SPGD 204 may have a typical 700 to 2100 MHz primary/secondary antenna, but also enable dual 2.6 GHz antennas to reduce requirements on the primary/secondary antenna.

While the SPGD 204 has been described as bridging the SPDs 206 to WAN networks, aspects of the disclosure contemplate using the SPGD 204 to bridge either traditional phones or WAN-enabled SPDs 206 to Wi-Fi (or wired gateway if the SPGD 204 includes an Ethernet connector) through the SPGD 204. Such an embodiment provides an example of a portable and wireless femto-cell solution. In general, the SPGD 204 bridges multiple heterogeneous and/or homogeneous networks in either direction.

The SPGD 204 may implement restrictions to limit access by the SPDs 206 to the network(s) associated with the SPGD 204. For example, the SPGD 204 may implement temporal restrictions (e.g., days, times, cumulative durations), location-based restrictions (e.g., the SPGD 204 may only be used within particular regions, buildings, or other boundaries), and/or other restrictions. For example, a short-term, temporary, and/or promotional SPGD 204 may be provided to the user 102 by an entity (e.g., business, sponsor, etc.) to access only a particular network (e.g., associated with the business, sponsor, etc.), only at a particular location, and/or only for a particular time/duration.

While the SPGD 204 has been described as supporting a single user's SPDs 206, the SPGD 204 may also provide a partial or full set of services to devices of other users 102. For example, the SPGD 204 may offer one user 102 the full set of services, but allow other users 102 (e.g., children of the user 102) to have access to shared music, WAN data access, etc.

At least a portion of the functionality of the various elements in FIG. 2 may be performed by other elements in FIG. 2, or an entity (e.g., processor, web service, server, application program, computing device, etc.) not shown in FIG. 2.

In some embodiments, the operations illustrated in FIG. 4 and FIG. 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

While no personally identifiable information is tracked by aspects of the disclosure, embodiments have been described with reference to data monitored and/or collected from the users 102. In some embodiments, notice may be provided to the users 102 of the collection of the data (e.g., via a dialog box or preference setting) and users 102 are given the opportunity to give or deny consent for the monitoring and/or collection. The consent may take the form of opt-in consent or opt-out consent.

Exemplary Operating Environment

An exemplary operating environment for the SPGD 204 and SPDs 206 is next described. In some embodiments, the SPGD 204 may be implemented using analog techniques to perform the operations described herein. For example, the operations may be performed by an analog computing device and/or a digital computing device.

The SPGD 204 has one or more computer readable media such as a memory area. The memory area includes any quantity of media associated with or accessible by the SPGD 204. The memory area may be internal to the SPGD 204, external to the SPGD 204, or both. In some embodiments, the memory area includes read-only memory and/or memory wired into an analog computing device. Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Communication between the SPGD 204 and SPDs 206 may occur using any protocol or mechanism over any wired or wireless connection. Further, the SPGD 204 and one or more of the SPDs 206 may be in wearable or accessory form factors (e.g., watches, glasses, headsets, or earphones).

The SPD 206 may include a mobile computing device or any other portable device. In some embodiments, the mobile computing device includes a mobile telephone, laptop, tablet, computing pad, netbook, programmable consumer electronics, gaming device, and/or portable media player. The SPD 206 may also include less portable devices such as desktop personal computers, kiosks, set top boxes, tabletop devices, industrial control devices, wireless charging stations, and electric automobile charging stations, if within the PAN 202 of the user 102. Additionally, the SPD 206 may represent a group of processing units or other computing devices.

At least a portion of the functionality of the various elements described herein may be performed by other elements, or an entity (e.g., processor, web service, server, application program, computing device, etc.) not explicitly identified herein.

In some embodiments, the operations described herein may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area and/or metro-area networks such as white-space, satellite, WiMAX (Worldwide Interoperability for Microwave Access), and others. The term "NFC" as used herein refers, in some embodiments, to a short-range high frequency wireless communication technology for the exchange of data over short distances. The term "PAN" as used herein refers, in some embodiments, to any short-range network allowing multiple devices to interact. Exemplary PANs 202 include, but are not limited to, wireless USB, Zigbee, 802.11d (60 GHz), and others.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user 102 in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for augmenting capabilities of the SPDs 206. For example, one or more of the embodiments of the SPGD 204 contemplate means for providing the catalog 216 of services to each of the SPDs 206, means for receiving requests from the SPDs 206 for the services in the provided catalog 216, and means for performing the requested services (on behalf of the requesting SPDs 206) using the computing resources of the SPGD 204. Further, one or more embodiments of the SPD 206 contemplate means for selecting at least one of the services from the catalog 216 provided by the SPGD 204 via the PAN 202, and means for sending a request for the selected service to the SPGD 204, wherein the request includes data relating to the selected service and wherein the SPGD 204 performs, using the data, the selected service on behalf of the SPD 206 using computing resources associated with the SPGD 204.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for augmenting capabilities of smart personal devices (SPDs), said system comprising:
   a smart personal gateway device (SPGD) having computing resources associated therewith, the computing resources including at least an SPGD memory area and an SPGD processor, the SPGD memory area storing a catalog of services offered by a plurality of smart personal devices (SPDs) within a personal area network (PAN) to the SPGD, the SPGD processor programmed to:
      detect the SPDs are within a physical range of the PAN to directly communicate with the SPGD;
      provide the catalog of services from the SPGD to the SPDs within the physical range of the PAN;
      receive a request from at least one of the SPDs within the physical range of the PAN and in direct communication with the SPGD for a service provided to the catalog by another SPD within the physical range of the PAN and in direct communication with the SPGD; and
      perform the requested service of said another SPD for said requesting at least one of the SPDs using the computing resources of the SPGD.

2. The system of claim 1, wherein the catalog of services includes at least one of: communication services, authentication services, or location services.

3. The system of claim 2, wherein the communication services comprise at least one of: cellular voice services, cellular data services, or short messaging system (SMS) services provided from the at least one of the SPDs through the SPGD over the PAN.

4. The system of claim 1, wherein the catalog of services includes at least one of: storage services, inertial motion services, or user interface services.

5. The system of claim 4, wherein the storage services include at least one of: media library storage, file system storage, calendar storage, or address book storage.

6. The system of claim 1, wherein the catalog of services includes at least one of: audio capture, video capture, image capture, visual display, audio rendering, video rendering, or image rendering.

7. The system of claim 1, wherein the SPDs include at least one of: a slab device, a watch, or glasses.

8. The system of claim 7, wherein the slab device comprises at least one of a mobile telephone, a tablet, or a laptop.

9. The system of claim 1, wherein the at least one SPD lacks cellular voice services, wherein the computing resources of the SPGD further include a cellular modem and a communication stack, and wherein the at least one SPD makes a telephone call via the SPGD.

10. The system of claim 1, wherein the SPGD further includes a near field communication (NFC) radio and coil, the SPGD processor being further programmed to perform financial transactions on behalf of the plurality of SPDs.

11. The system of claim 1, wherein the SPGD further includes a projector, instead of a screen, for displaying data to a user associated with the PAN.

12. A method comprising:
   detecting a smart personal gateway device (SPGD) is within a physical distance of a personal area network (PAN) to directly communicate with a first smart personal device (SPD), the first SPD comprising a mobile computing device;
   accessing, by the first SPD directly from the SPGD, a catalog of services provided to the SPGD from one or more other SPDs within the physical distance of the PAN to the SPGD;
   selecting, by the first SPD, at least one of the services from the catalog accessible over the PAN through the SPGD, the selected at least one of the services being provided to the SPGD from a second SPD within the physical distance of the PAN to directly communicate with the SPGD; and
   providing, from the first SPD to the SPGD over the PAN, data relating to the selected at least one of the services, wherein the SPGD performs, using the provided data, the selected at least one of the services on behalf of the first SPD using computing resources associated with the SPGD.

13. The method of claim 12, further comprising receiving, from the SPGD, data related to performance of the at least one of the services using the provided data.

14. The method of claim 13, wherein the received data represents data received by the SPGD from a wide area network (WAN), wherein the first SPD receives the data related to performance of the at least one of the services from the SPGD while the first SPD and the SPGD are within the physical range of the PAN.

15. The method of claim 12, further comprising registering, by the second SPD, one or more services with the SPGD.

16. The method of claim 15, wherein selecting the at least of the services comprises subscribing to the one or more services.

17. Computer storage memory embodying computer-executable components, said components comprising:
   a discovery component associated with a smart personal gateway device (SPGD) that when executed causes at least one processor to detect one or more smart personal devices (SPDs) within a physical range, relative to the SPGD, of a personal area network (PAN);
   a catalog component that when executed causes the at least one processor to provide identification of a set of services of the SPDs within the physical range of the PAN detected by the discovery component;
   a communications interface component that when executed causes the at least one processor to receive a request from one of the SPDs within the physical range of the PAN for at least one of the services, the received request including data relating to the requested service; and
   a provisioning component that when executed causes the at least one processor to perform, by the SPGD on behalf of the SPD using computing resources associated with the SPGD, the requested service using the received data from said one of the SPDs.

18. The computer storage memory of claim 17, wherein the discovery component further searches for at least one additional SPD within a predefined range of the SPGD and detects the additional SPD in response to the searching, and further comprising a security component for authenticating the detected, additional SPD, the catalog component further providing identification of the set of services to the authenticated, additional SPD.

19. The computer storage memory of claim 17, wherein the provisioning component performs the requested service to act as an endpoint for wide area network services and to act as a server to the SPD for the wide area network services.

20. The computer storage memory of claim 17, wherein the SPGD further:
   caches electronic mail messages received from an electronic mail service;
   identifies one or more of the SPDs subscribed to the electronic mail service; and
   notifies the identified SPDs of the cached electronic mail messages.

* * * * *